(No Model.)                A. W. LOCKHART.                2 Sheets—Sheet 1.
                            GRAIN SEPARATOR.
No. 305,203.                                Patented Sept. 16, 1884.
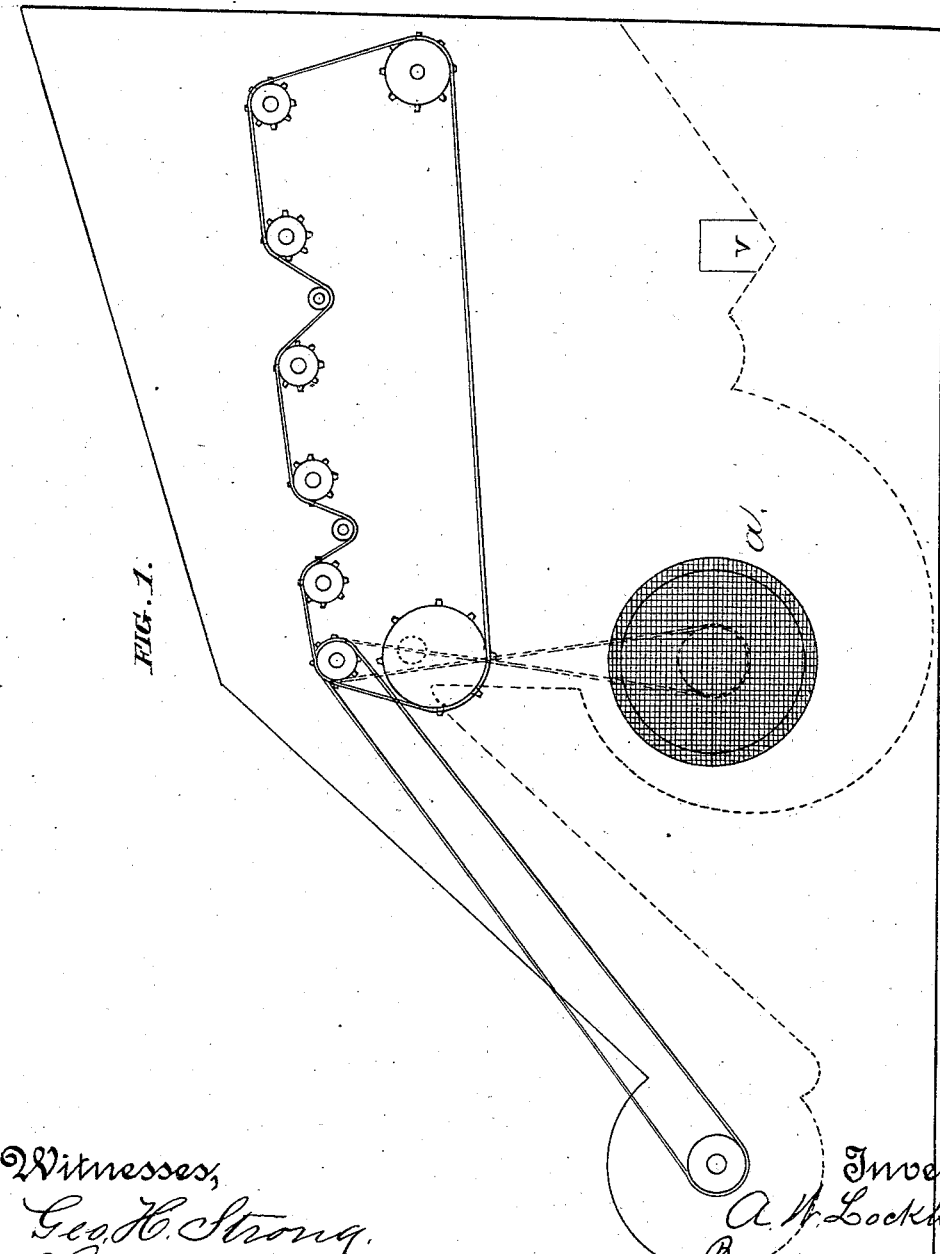

(No Model.)  2 Sheets—Sheet 2.
A. W. LOCKHART.
GRAIN SEPARATOR.
No. 305,203.  Patented Sept. 16, 1884.
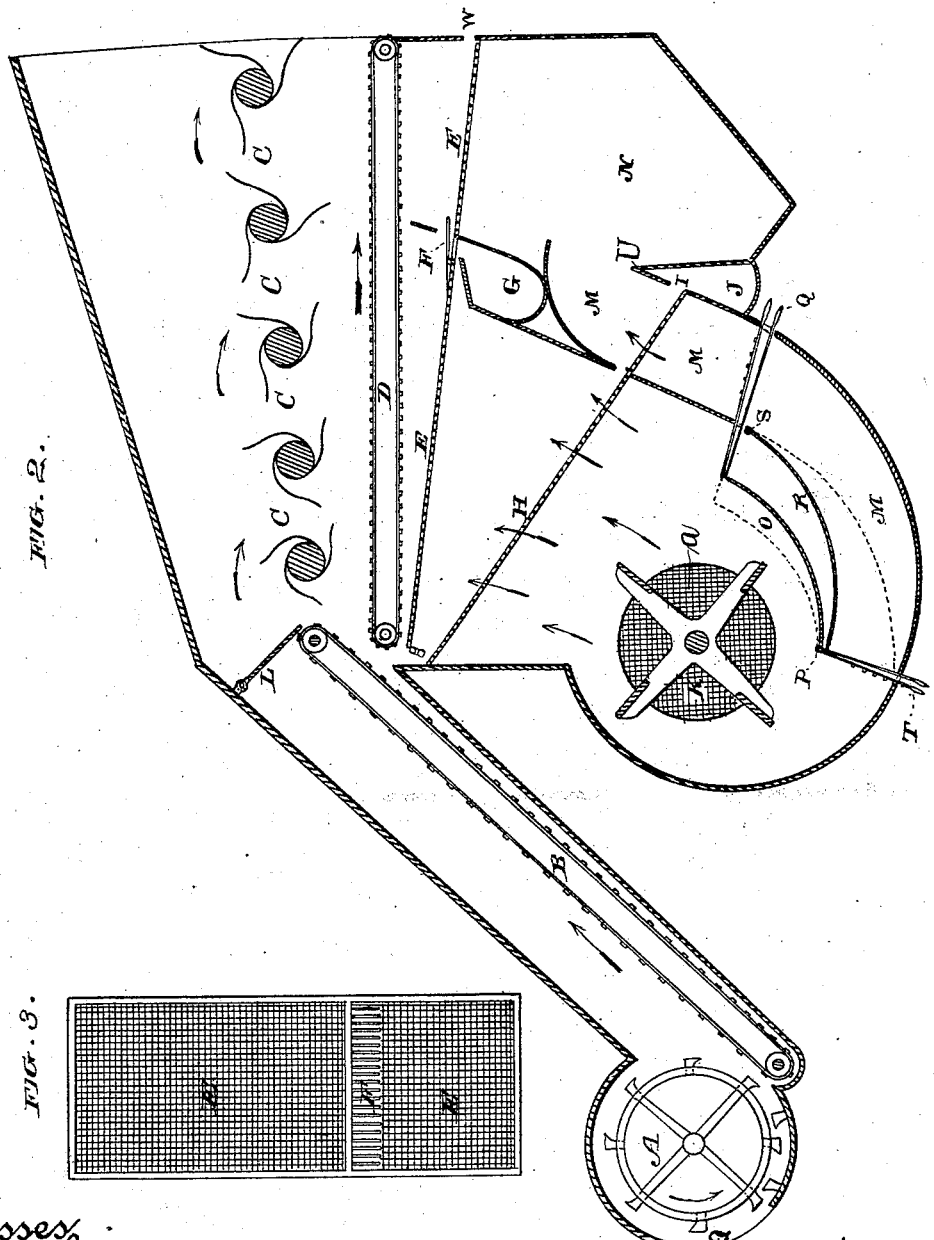
Witnesses,
Geo. H. Strong.
J. H. Krouse.
Inventor,
A. W. Lockhart
By Dewey & Co.
Attorneys

UNITED STATES PATENT OFFICE.

ALEXANDER W. LOCKHART, OF STOCKTON, CALIFORNIA.

GRAIN-SEPARATOR.

SPECIFICATION forming part of Letters Patent No. 305,203, dated September 16, 1884.

Application filed January 30, 1884. (No model.)

*To all whom it may concern:*

Be it known that I, ALEXANDER W. LOCKHART, of Stockton, county of San Joaquin, and State of California, have invented an Improvement in Grain-Separators; and I hereby declare the following to be a full, clear, and exact description thereof.

My invention relates to an apparatus for separating thrashed grain from the straw, making the usual preliminary or ordinary cleaning of the grain, and also the recleaning, by which the grain is prepared for market, in a single continuous operation; and it consists in certain details of construction, all of which will be more fully explained by reference to the accompanying drawings, in which—

Figure 1 is a side elevation of my apparatus, showing the driving-belts. Fig. 2 is a longitudinal vertical section through it. Fig. 3 is a view of the screen.

This apparatus may be employed with a stationary thrashing-machine, or with a traveling header and thrasher; but in the present case I have only shown as much as is necessary to explain my particular invention.

A is the thrashing-cylinder, from which the thrashed straw and grain are carried up by a belt, B, and are delivered to a series of rotary lifters, pickers, or carriers, C, which extend for some distance back in a slightly-inclined position. These pickers consist of peculiarly-bent steel wires fixed upon horizontal shafts transverse to the line of travel of the machine. The inner ends of the wires are fixed to the shafts, and they form partial coils, increasing their distance from the shafts as they pass around, and the outer ends form a reverse curve, the pickers thus forming an elastic surface upon which the straw is received, and by which it is lifted, loosened, and separated, so that the grain may easily fall through, while the outer ends of each set receive the straw from the preceding ones, and carry it forward to the next. Beneath these pickers is an open-slot traveling belt, D, through which the grain will readily fall, but which arrests any straw, weeds, or large stuff which may fall through and carries it out at the tail of the machine. The grain, white caps, or partially-thrashed grain from above falls upon an inclined riddle, E, which may have an end shaking movement, so that while the grain falls through it the lighter and more bulky chaff, white caps, &c., will move along the surface toward the discharge end. At a point in the length of the riddle is a transverse screen, F, of parallel wires, which allows the white caps or partially-thrashed heads to fall through into a chute or auger-tube at G, by which they are carried out, to be returned to the thrashing-cylinder. The chaff passes on and discharges at the tail of the machine. Beneath this riddle is an inclined chute, H, made of wire-gauze of so fine a mesh that no grain or material can pass down through it, but which allows air to pass upward through it freely. The grain slides down this incline to a point of discharge, I, at the lower end, and the clean perfect grain falls into an auger-tube or chute, J, and is carried out to be sacked. The tailings, cheat, oats, and other lighter material are separated from the good grain near the lower end of the chute by an operation to be hereinafter described, which produces the secondary cleaning.

K is a rotary fan or other device for supplying a blast of air. In the present case a fan is shown, drawing air in through openings around the shaft and discharging it at the periphery.

In order to prevent dust, insects, or other foreign substances from being drawn in and thrown upward against the wire-gauze grain-chute, the open ends through which the air is admitted to the fan-casing are protected by a screen material, *a*, as the lower surface of the gauze chute would otherwise soon become clogged and prevent the passage of air. This fan is situated beneath the front and highest end of the wire-gauze chute H, before described, and has no casing over that portion. This allows a blast of air to pass vertically upward through the chute, the riddle, traveling belt, and the pickers, and thus lifts the straw and chaff and loosens it, so that the grain may fall down through, as before described, while the lighter impurities are carried upward and prevented from coming down with the grain.

The carrying-belt B from the thrashing-cylinder may be inclosed, and at the upper end, where it delivers the straw and grain upon the revolving pickers, a gate, L, is placed, hinged at the top, so that the straw will lift it as it passes. As the space above the pickers is closed at the top and sides and open at the rear, a large portion of the chaff will be carried out in that direction, and also along the line of the traveling belt D. From a point below the fan a curved air-trunk, M, passes partially around, as shown, and extends up across the lower end of the wire-gauze grain-chute H, its mouth curving backward just below the chute or auger G and opening into a chamber, N. The lower edge of this opening is just above the narrow slot I at the foot of the chute H, through which the clean grain passes into the chute or auger-spout J, which is situated between the air-trunk M and the chamber N. The action of the air-blast which passes up through the trunk M is to throw the cheat, barley, oats, and light stuff over the edge U into the chamber N, while the heavier perfect wheat passes down through the discharge-opening I, as before described. The first or ordinary cleaning takes place in the upper part of the machine before the grain reaches the inclined foraminous chute H, and the secondary or final cleaning takes place at the lower end of this chute, and by the action of the blast through the trunk M. The front side of the trunk M extends up by the spout G to a point close to the riddle E, and serves to direct the upward current of air and prevent its being dissipated toward the rear. The slots in the sides of the air-trunk through which the chute H passes are only wide enough to allow the stream of grain to pass, and will allow but little air to escape through them. The current of air which is thrown upward from the top of the fan is directed by a curved gate, O, hinged at its lower end at P, and having its upper end movable by means of an adjusting-rod, Q. The current of air which enters the trunk M is controlled and regulated by means of a curved gate, R, which forms the inner side of the curved portion of the trunk, and is hinged at its upper end, S, so that by means of an adjusting-rod, T, the mouth may be opened or closed to suit the requirements. The blast of air which passes up through the trunk M and through that part of the gauze chute H which crosses it throws the cheat, barley, oats, and light tailings over the lower edge of the mouth at U, so that they fall into the chamber N, and may be removed by a gate at V or an auger. The rear of the chamber N is also closed, with the exception of a narrow slot at W for the rear end and discharge of the riddle E, and this causes the air from the trunk M to be directed upward through the rear portion of the riddle. The pickers, traveling belt D, and eccentric-shaft which operates the riddle E may be driven by a single belt, which may be of chain or other material, and these may be connected with the fan-shaft in a traveling machine; but I do not wish to limit myself to any particular arrangement of belts.

Having thus described my invention, what I claim as new, and desire to secure by Letters Patent, is—

1. In a grain-separator, a secondary separator or recleaner consisting of an inclined perforated chute, over which the grain passes, in combination with an air-trunk crossing the lower end of the chute, so that a blast of air may be forced upward through it, and receiving-chutes J and N, substantially as herein described.

2. In a grain-separator, a series of rotating pickers, upon which the thrashed straw is delivered, an open traveling belt beneath the pickers, and a shaking-riddle beneath the belt, in combination with a fan placed below, and having its casing opening upward, so as to discharge a blast through the riddle, belt, and pickers, substantially as herein described.

3. In a grain-separator, a series of rotating pickers, upon which the thrashed straw and grain are delivered, an open traveling belt, and a shaking-riddle below the pickers, in combination with an inclined foraminous grain-chute permeable only to air, situated beneath the riddle, and means whereby a current of air is forced upward through the chute, riddle, belt, and pickers, substantially as herein described.

4. In a grain-separator, a series of rotary pickers, upon which the thrashed straw and grain are delivered, a traveling belt, a riddle, and an inclined foraminous grain-chute placed successively beneath the pickers, and means whereby a current of air is forced upward through them, in combination with an air-trunk, M, crossing the lower end of the foraminous chute, and a chamber, N, into which it discharges, substantially as herein described.

5. In a grain-cleaner, a series of rotating pickers, a traveling belt, a riddle, and an inclined foraminous grain-chute, a blast apparatus situated beneath them, and an air-trunk, M, crossing the lower end of the grain-chute, in combination with the receiving and discharge chambers or spouts G, J, and N, substantially as herein described.

6. In combination with the grain-chute, riddle, traveling belt, and rotating pickers, as shown, the fan K, its open-topped casing, the hinged curved direction-gate O, and an adjusting-rod, Q, substantially as herein described.

7. In combination with the fan K, the open-topped casing, and the supplemental air-trunk M, the hinged curved gate R, forming one side of the trunk, and the adjusting rod or arm T, substantially as herein described.

In witness whereof I have hereunto set my hand.

ALEXANDER W. LOCKHART.

Witnesses:
S. H. NOURSE,
H. C. LEE.